(No Model.)
D. P. SHARP.
SULKY PLOW.
No. 244,825. Patented July 26, 1881.
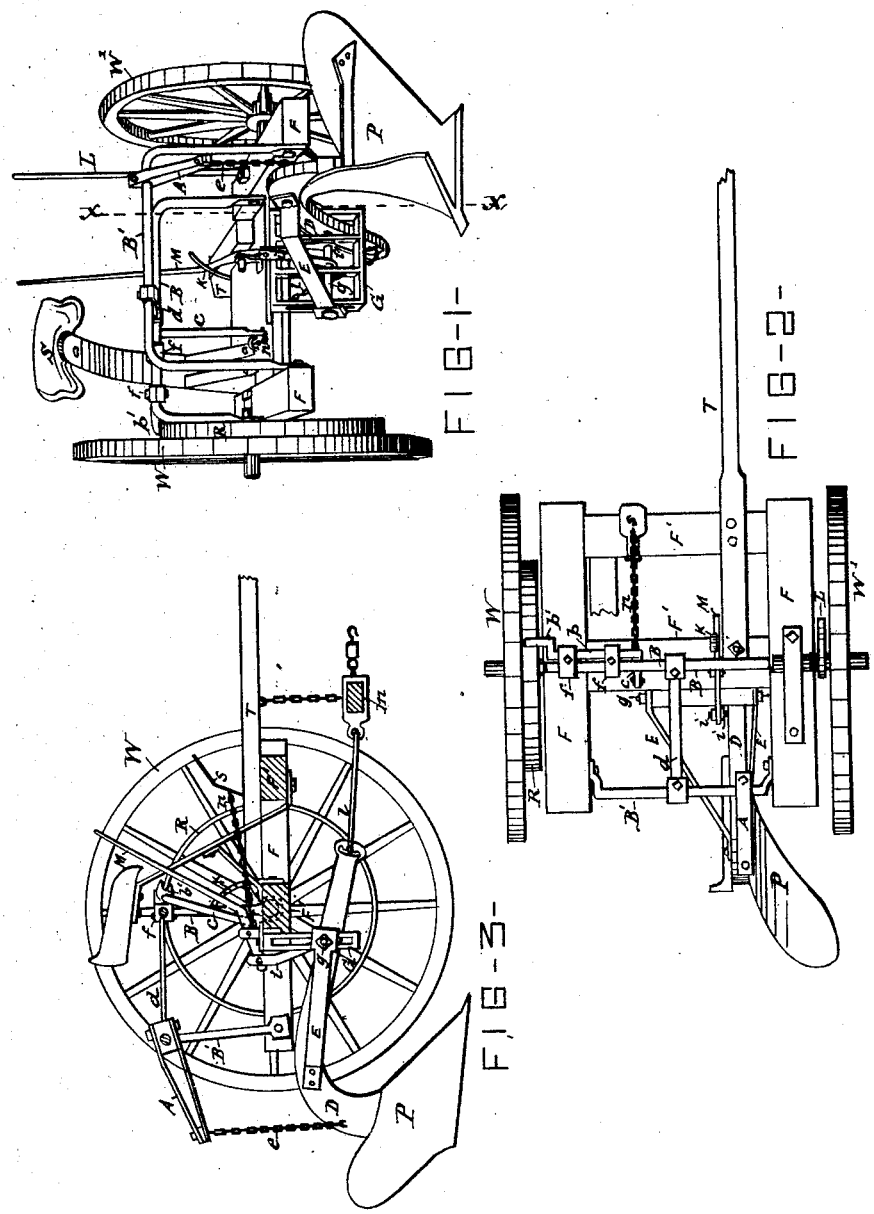
WITNESSES=
INVENTOR=
Dennis P. Sharp
per Duell, Laass & Hey
his Attorneys

UNITED STATES PATENT OFFICE.

DENNIS P. SHARP, OF ITHACA, NEW YORK, ASSIGNOR TO C. M. SHARP, OF SAME PLACE.

SULKY-PLOW.

SPECIFICATION forming part of Letters Patent No. 244,825, dated July 26, 1881.

Application filed May 21, 1881. (No model.)

*To all whom it may concern:*

Be it known that I, DENNIS P. SHARP, of Ithaca, in the county of Tompkins, in the State of New York, have invented new and useful Improvements in Sulky-Plows, of which the following, taken in connection with the accompanying drawings, is a full, clear, and exact description.

This invention relates to a novel construction and combination of a sulky and certain devices connected therewith, which are adapted to be applied to and co-operate with any ordinary plow, and by means of which said plow can, when required, be raised out of the ground with the greatest facility and without materially straining the sulky.

The following description of the construction and combination of the constituent parts of my invention will serve to enable others skilled in the art to make and use the same.

In the annexed drawings, Figure 1 is a perspective view of my invention; Fig. 2, a plan view of the same, and Fig. 3 a vertical transverse section on line $x$ $x$ of Fig. 1.

Similar letters of reference indicate corresponding parts.

F F are the two side beams of the sulky-frame, united by cross-beams F' F' at the forward end and near the center.

W W' are the traction-wheels, which on sulky-plows are sometimes designated "land-wheel" and "furrow-wheel," respectively, the one traveling on the unplowed land and the other in the furrow made by the plow. The land-wheel is mounted on an ordinary gudgeon secured to the sulky-frame, while the furrow-wheel is connected with a crank axle or gudgeon having an offset, which, by means of a lever, L, can be turned so as to bring the spindle or journal on which the furrow-wheel is mounted relatively lower than the axle of the land-wheel, and thus compensate for the depth of the furrow in which the wheel W' travels.

To the sulky-frame is firmly attached a pendent vertically-slotted guide-frame, G, through the slot of which passes an arbor, $g$.

P denotes an ordinary plow, having a rigid beam, D, which passes forward under the sulky-frame in range with the tongue T or line of draft, and has the arbor $g$ passing through it at a point intermediate of its length, and is thus hinged or pivoted to the sulky. The plow is sustained laterally by braces E E, secured to the sides thereof and pivoted at their opposite ends on the ends of the arbor $g$. Said arbor is held adjustably in its position relative to its elevation above the ground by means of straps $i$, connected thereto and to a lever, M, which latter is pivoted on top of the sulky-frame, and held in its desired position by a suitable rack, K. By swinging said lever the pivotal connection of the plow can be placed at a greater or less elevation above the ground. The forward extremity of the plow is, by means of a chain, $l$, connected with the double-tree $m$, which is suspended from the tongue T, as shown in Fig. 3 of the drawings.

To the inner side of the land-wheel W is rigidly secured a concentric rim or flange, R.

On the top of the sulky-frame is an iron bail, B, which is extended across the sulky-frame and has its extremities pivoted thereon. Said bail is of a height nearly or quite equal to the radius of the rim R.

In suitable bearings, $f f$, secured to the upper or horizontal portion of the bail B, is journaled a bar, $b$, one end of which is provided with a bifurcated head or clutch, $b'$, adapted to gripe both the inner and outer side of the rim R. The opposite end of the bar $b$ has a rigid pendent arm, $c$, the lower extremity of which is connected with a flexible or hinged step, S, in front of the driver's seat, by means of a chain or rod, $n$. Back of the bail B, and parallel therewith, is another bail, B', likewise hinged to the sulky-frame. The two bails are connected with each other by a rod or strap, $d$, secured at opposite ends to the respective bails in any suitable manner, which allows said bails to turn on their described connection. A is an arm firmly secured on the bail B', and projecting rearward directly over the plow-beam D, to the rear extremity of which it is connected by a chain, $e$.

The operation of my invention is as follows, to wit: All parts being connected in the manner before described and the machine brought into the field for operation, the pivotal rod or arbor $g$ is raised or lowered by means of the lever M, according to the depth the plow is intended to penetrate the ground. If, in the course of the operation of the machine, the plow has to be raised out of the ground, either in turning at the end of the furrow or to pass over a heavy or immovable bowlder or other obstruction, the driver presses with his foot against the step S sufficiently to cause it to draw on the chain $n$, and thereby swing the arm $c$ so as to throw the bifurcated head or clutch $b'$ into engagement with the rim R, and thereby cause it to gripe the same to such an extent as to compel it to carry with it in its rotation the bail B, the motion of which is transmitted to the bail B' by the connecting-strap $d$, and the latter bail, by its arm A and chain $e$, raises the plow out of the ground. So soon as this is accomplished the plow is allowed to drop back into its operative position by removing the pressure from the step S, which causes the clutch $b$ to release the rim R.

If desired, a suitable stop may be arranged to come in contact with the lifting mechanism and automatically throw the clutch out of its engagement with the rim R. Furthermore, the rear bail, B', may be secured rigid on the sulky-frame, and the motion of the forward bail, B, transmitted to the rear end of the plow by means of a chain extended from the forward bail over a pulley or sheave on the rear bail, and thence to the rear extremity of the plow.

What I claim as new, and desire to secure by Letters Patent, is—

In combination with the wheel W, provided with the concentric rim R, bail B, pivoted on the sulky-frame, step S, and clutch $b$ $c$, connected to said bail, the bail B', arranged at the rear of bail B, and connected therewith by the strap $d$, the rearward-projecting arm A, secured to the bail B', the plow P, pivoted to the sulky-frame, and the chain $e$, connecting the arm A with the rear extremity of the plow-beam, all constructed and combined substantially in the manner described and shown, for the purpose set forth.

In testimony whereof I have hereunto signed my name and affixed my seal, in the presence of two attesting witnesses, at Syracuse, in the county of Onondaga, in the State of New York, this 18th day of May, 1881.

DENNIS P. SHARP. [L. S.]

Witesses:
  K. L. HEY,
  WM. C. RAYMOND.